(12) United States Patent
Parker

(10) Patent No.: US 9,370,454 B1
(45) Date of Patent: Jun. 21, 2016

(54) COMPACT DRIVE MECHANISM FOR WHEELED PERSONAL TRANSPORTER AND METHOD

(71) Applicant: Avant Mobility, LLC, Paramus, NJ (US)

(72) Inventor: David E. Parker, Clemmons, NC (US)

(73) Assignee: Avant Mobility, LLC, Paramus, NJ (US)

( * ) Notice: Subject to any disclaimer, the term of this patent is extended or adjusted under 35 U.S.C. 154(b) by 130 days.

(21) Appl. No.: 14/311,936

(22) Filed: Jun. 23, 2014

Related U.S. Application Data

(60) Provisional application No. 61/838,424, filed on Jun. 24, 2013.

(51) Int. Cl.
    *B62M 11/14* (2006.01)
    *A61G 5/02* (2006.01)
    *B62M 11/18* (2006.01)

(52) U.S. Cl.
    CPC .............. *A61G 5/024* (2013.01); *A61G 5/021* (2013.01); *A61G 5/023* (2013.01); *B62M 11/14* (2013.01); *B62M 11/18* (2013.01)

(58) Field of Classification Search
    CPC ....... A61G 5/021; A61G 5/022; A61G 5/023; A61G 5/028; B62M 11/14; B62M 11/145; B62M 11/18; B62M 2700/001
    USPC .......... 475/294, 12, 331; 280/252, 236, 250.1
    See application file for complete search history.

(56) References Cited

U.S. PATENT DOCUMENTS

| | | | |
|---|---|---|---|
| 4,560,181 A | 12/1985 | Herron | |
| 5,167,168 A | 12/1992 | Beumer | |
| 5,362,081 A | 11/1994 | Beidler et al. | |
| 5,632,499 A | 5/1997 | Hutcherson et al. | |
| 5,970,822 A * | 10/1999 | Jung | B62M 1/00 280/236 |
| 5,996,344 A | 12/1999 | Frenette et al. | |
| 6,017,046 A | 1/2000 | Markovic | |
| 6,715,780 B2 | 4/2004 | Schaeffer et al. | |
| 6,820,885 B1 | 11/2004 | Oshimo | |
| 6,893,035 B2 | 5/2005 | Watwood et al. | |
| 7,344,146 B2 | 3/2008 | Taylor | |
| 7,837,210 B2 | 11/2010 | Kylstra et al. | |
| 2002/0153691 A1 | 10/2002 | Liao et al. | |
| 2011/0190086 A1 * | 8/2011 | Yang | B62M 9/00 475/12 |

* cited by examiner

*Primary Examiner* — Anne Marie Boehler
(74) *Attorney, Agent, or Firm* — Arthur Jacob

(57) ABSTRACT

A compact drive assembly for a wheeled transporter, illustrated as a wheelchair, and method convert reciprocating input forces applied by oppositely-directed essentially linear strokes to a drive shaft journaled for rotation in opposite directions of rotation about a central axis of rotation within the drive assembly, into rotation of a drive wheel of the transporter in a given single direction of rotation. Oppositely oriented clutches couple the drive shaft with respective sun gears. Sets of planet gears are engaged with corresponding ones of the sun gears and are overlapped for engagement with one-another. One of the sun gears is coupled to the drive wheel such that upon rotation of the drive shaft alternately in the first direction and the second direction in response to the oppositely-directed strokes, the drive wheel is rotated in the same given single direction of rotation during each direction of rotation of the drive shaft.

18 Claims, 10 Drawing Sheets

COMPACT DRIVE MECHANISM FOR WHEELED PERSONAL TRANSPORTER AND METHOD

This application claims the benefit of U.S. Provisional Patent Application Ser. No. 61/838,424, filed Jun. 24, 2013, the entire disclosure of which is incorporated herein by reference thereto.

The present invention relates generally to drive mechanisms and pertains, more specifically, to a compact gear drive mechanism for effecting a rotary power output in response to a reciprocating input in the form of essentially linear arm or leg movements of an operator and, more particularly, to a drive system for a wheeled personal transporter, such as a wheelchair, in which reciprocating, essentially linear forces applied by an occupant's arm movements effect a rotary power output for driving the transporter.

In a preferred embodiment, the drive mechanism of the present invention enables a human operator to apply input power using reciprocating substantially linear arm motion or leg motion to create an effective rotary power output. A myriad of devices, equipment and apparatus which require a rotary power input force are improved by the incorporation of the present drive mechanism to allow a human operator to use arms or legs moved along substantially linear paths to apply, with greater ease, comfort and effectiveness, forces to be converted by the drive mechanism into a rotational output well suited to the provision of a requisite rotary power input force.

Examples of such devices, equipment and apparatus are as follows: Wheeled personal transporters such as bicycles, tricycles and carts in which substantially linear leg movements of an operator are used to create a rotational output for driving at least one drive wheel of the transporter; boat propulsion systems in which substantially linear arm or leg movements of an operator create a rotational power output to at least one propeller of the propulsion system; exercise equipment and machines in which substantially linear arm or leg movements drive at least one rotating resistance member; lifts, hoists, winches and windlasses in which a power input from substantially linear arm movements provide rotational power for rotating a drum or pulley system. In addition, the present gear drive mechanism is adapted readily to a very wide variety of industrial uses where substantially linear movements of a worker's arms or legs can be converted effectively to provide a rotary power output. In a preferred embodiment, the present invention provides a more effective, comfortable and efficient drive mechanism for a personal transporter in the form of a wheelchair, enabling improved ease and mobility for persons who must utilize such a transporter.

A compact drive mechanism constructed in accordance with the present invention provides a unique drive system in which actuating handgrips conveniently are placed on drive wheels of a wheelchair for attaining highly desirable objects and advantages not heretofore made available in a conventional wheelchair drive system. Among these objects and advantages are: Increased effectiveness and greater simplicity of construction in a drive mechanism that converts reciprocating substantially linear input forces to a rotary power output; provides a compact construction for increased versatility and widespread use in a myriad of applications and, in particular, in a highly maneuverable wheelchair having limited dimensions for increased versatility and mobility; reduces any possible loss of effectiveness while converting reciprocating substantially linear input forces into a continuous rotary power output; enhances the control of velocity and maneuverability of a personal transporter such as a wheelchair; provides increased ease of operation and higher efficiency through a more uniform application of driving forces by an operator of the mechanism; exhibits smooth and quiet operation; reduces wear of component parts of a drive system; provides more resistance to dust, debris and other potential contaminants encountered in the field; reduces requirements for periodic maintenance and repair; enables increased longevity for exemplary performance over an extended service life.

The above objects and advantages, as well as further objects and advantages, are attained by the present invention, which may be described briefly as a compact drive assembly for a wheeled transporter having a drive wheel mounted for rotation upon an axle affixed to the transporter, the drive assembly being coupled with the drive wheel for rotating the drive wheel in a same given single direction of rotation in response to the application of reciprocating input forces applied to the drive assembly in opposite directions, the drive wheel having a hub with a central axis, the drive assembly comprising: a drive shaft journaled for rotation upon the axle, the drive shaft extending in an axial direction along the central axis of the hub; a first sun gear located upon the drive shaft; a first clutch coupling the first sun gear with the drive shaft for rotation in a first direction of rotation upon rotation of the drive shaft in the first direction, and releasing the first sun gear from rotation with the drive shaft upon rotation of the drive shaft in a second direction opposite the first direction; a second sun gear located upon the drive shaft axially adjacent the first sun gear; a second clutch coupling the second sun gear with the drive shaft for rotation in the second direction of rotation upon rotation of the drive shaft in the second direction, and releasing the second sun gear from rotation with the drive shaft upon rotation of the drive shaft in the first direction; at least one first planet gear engaged with the first sun gear for rotation with the first sun gear; at least one second planet gear engaged with the second sun gear for rotation with the second sun gear; the first planet gear axially overlapping the second planet gear along the axial direction and engaging the second planet gear for rotation of the second planet gear with the first planet gear; and an actuator coupled to the drive shaft for rotation of the drive shaft alternately in the first direction and the second direction in response to reciprocating forces applied to the actuator in corresponding opposite first and second strokes; the second sun gear being coupled to the hub such that upon rotation of the drive shaft alternately in the first direction and the second direction in response to the first and second strokes, respectively, the hub is rotated about the central axis in the same given single direction of rotation during each rotation of the drive shaft.

In addition, the present invention provides a method for driving a wheeled transporter having drive assembly coupled to a drive wheel mounted for rotation upon an axle affixed to the transporter, the method including rotating the drive wheel in a same single direction of rotation in response to the application of reciprocating input forces applied to the drive assembly in opposite directions, the drive wheel having a hub with a central axis, the method comprising: journaling a drive shaft for rotation upon the axle, with the drive shaft extending in an axial direction along the central axis of the hub; locating a first sun gear upon the drive shaft; coupling the first sun gear with the drive shaft with a first clutch oriented for rotation of the first sun gear in a first direction of rotation upon rotation of the drive shaft in the first direction, and releasing the first sun gear from rotation with the drive shaft upon rotation of the drive shaft in a second direction opposite the first direction; locating a second sun gear upon the drive shaft axially adjacent the first sun gear; coupling the second sun gear with the drive shaft with a second clutch oriented for rotation of the second sun gear in the second direction of rotation upon rotation of the drive shaft in the second direction, and releasing the second sun gear from rotation with the drive shaft upon rotation of the drive shaft in the first direction; engaging at least one first planet gear with the first sun gear for rotation with the first sun gear; engaging at least one second planet gear with the second sun gear for rotation with the second sun gear; overlapping the first planet gear axially with the second planet gear along the axial direction and engaging the second planet gear for rotation of the second planet gear with the first planet gear; coupling an actuator to the drive shaft for rotation of the drive shaft alternately in the first direction and the second direction in response to reciprocating forces applied to the actuator in corresponding opposite first and second strokes; coupling the second sun gear to the hub such that upon rotation of the drive shaft alternately in the first direction and the second direction in response to the first and second strokes, respectively, the hub is rotated about the central axis in the same single direction of rotation during each rotation of the drive shaft.

The invention will be understood more fully, while still further objects and advantages will become apparent, in the following detailed description of preferred embodiments of the invention illustrated in the accompanying drawing, in which.

Figure 1:
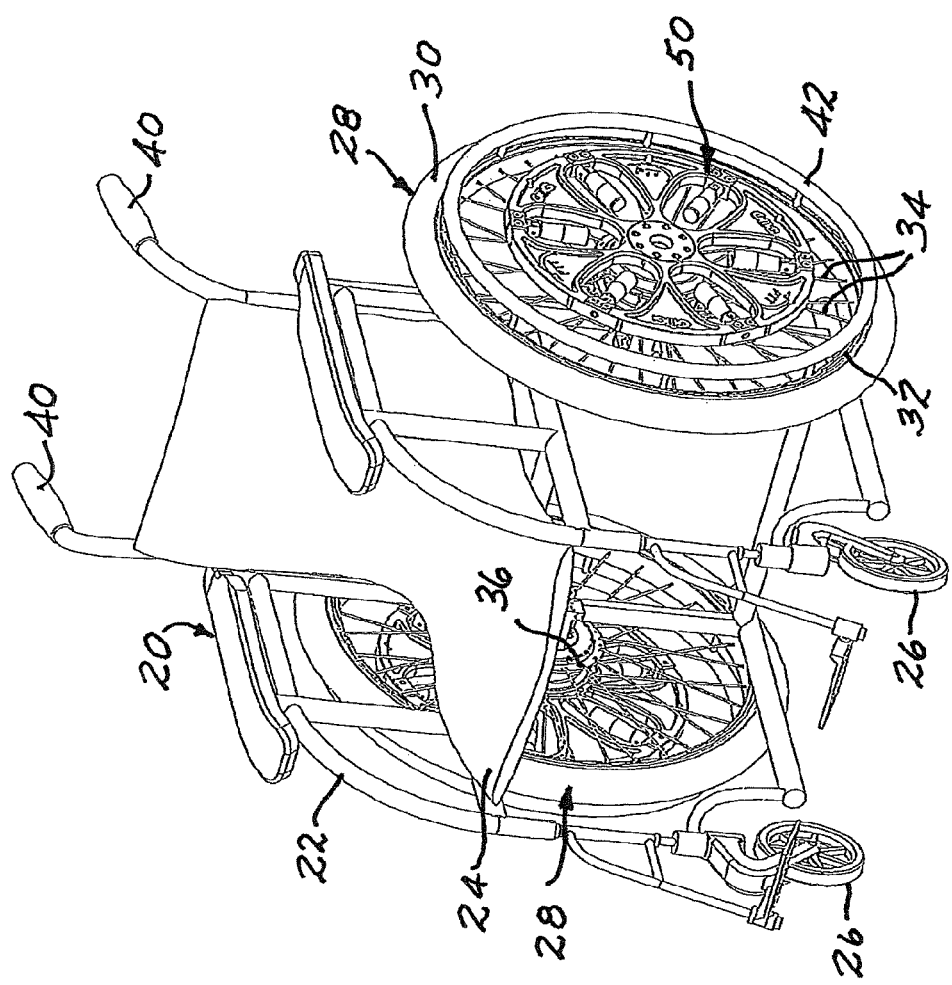
FIG. 1 is a front and left side pictorial view of a wheeled personal transporter in the form of a wheelchair constructed in accordance with the present invention.
Figure 2:
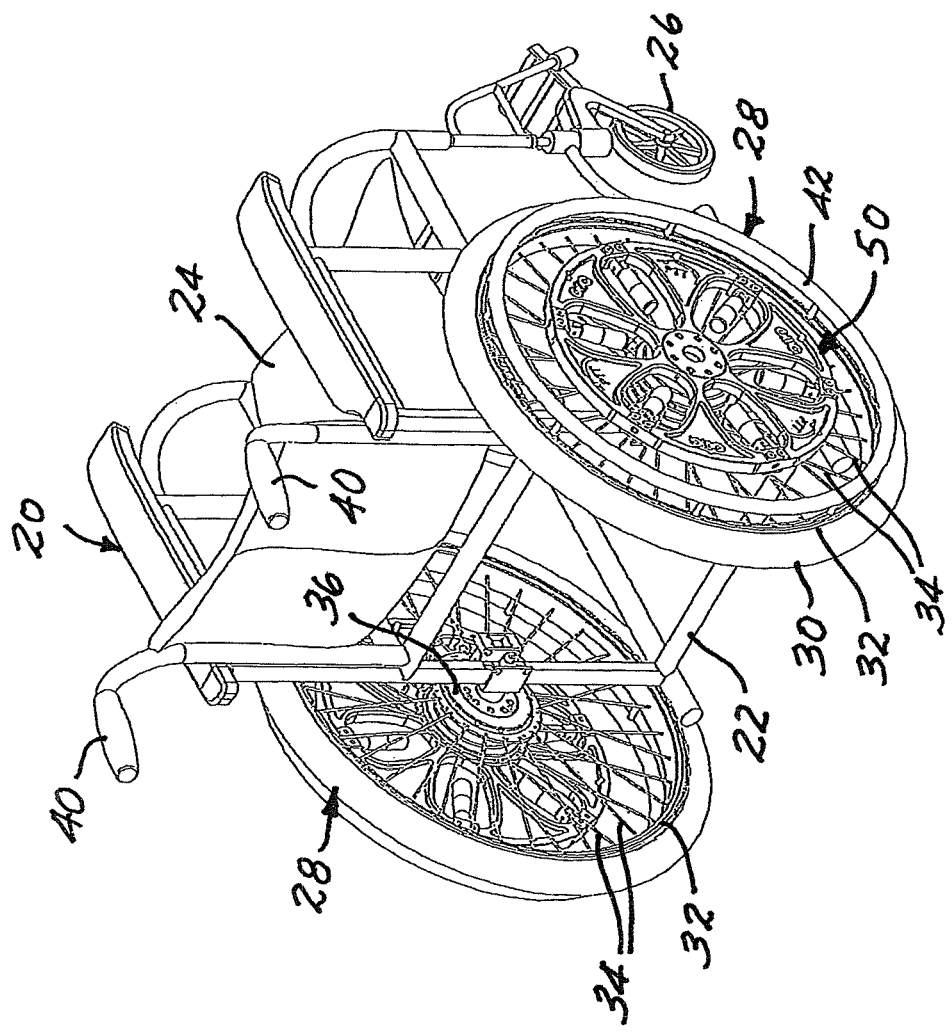
FIG. 2 is a rear and right side pictorial view of the wheelchair.
Figure 3:
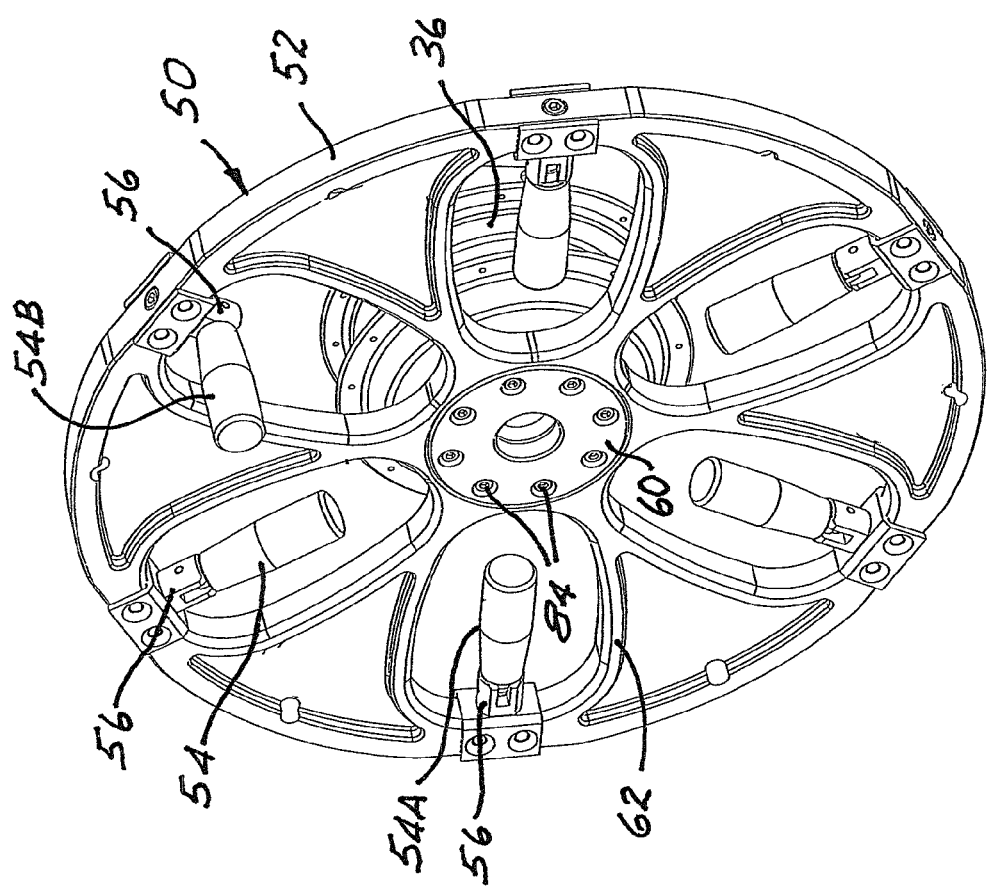
FIG. 3 is a fragmentary pictorial view of a component part of the wheelchair.
Figure 4:
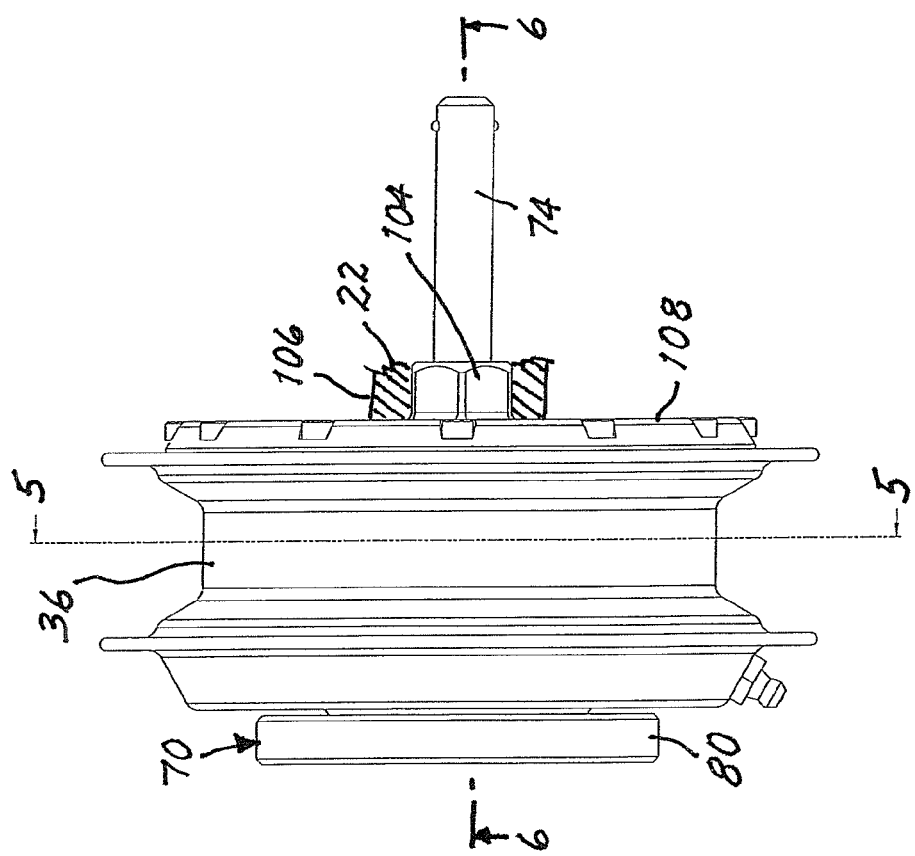
FIG. 4 is a fragmentary plan view showing the drive assembly of the wheelchair.
Figure 5:
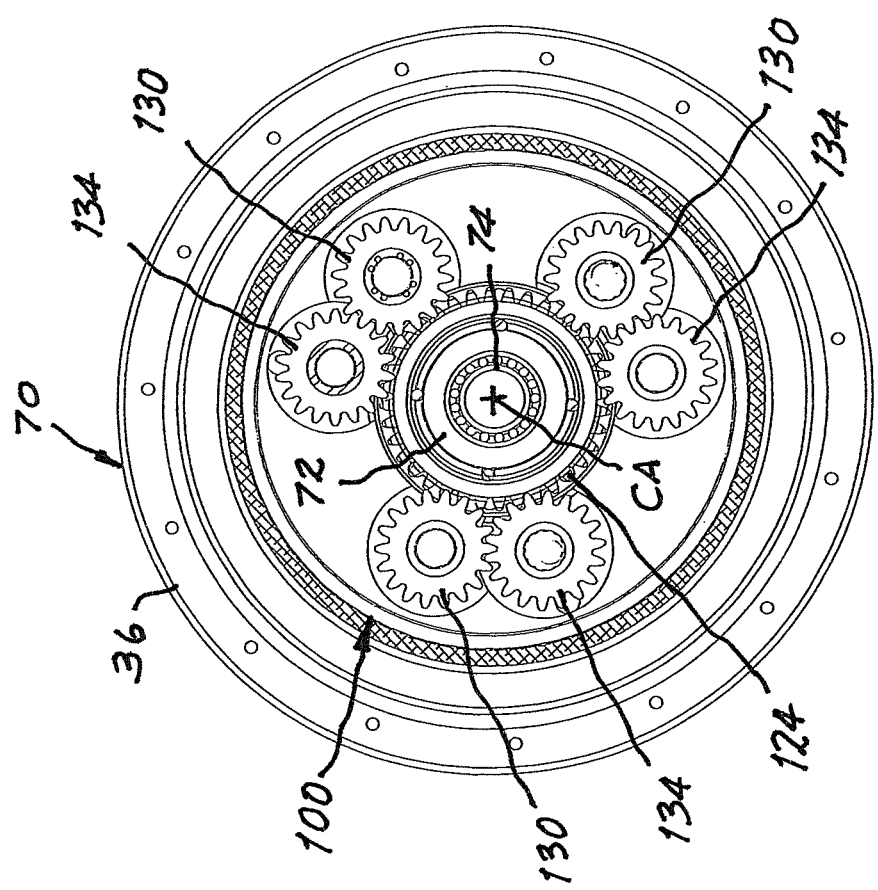
FIG. 5 is a cross-sectional view taken along line 5-5 of FIG. 4.

Referring now to the drawing, and especially to FIGS. 1 through 3 thereof, a wheeled personal transporter constructed in accordance with the present invention is shown in the form of a wheelchair 20 and is seen to have a frame 22 carrying a seat 24 and supported by forward wheels 26 and rear wheels 28. Rear wheels 28 each include a tire 30 carried by a rim 32 which, in turn, is supported by a plurality of spokes 34 radiating from a central hub 36 mounted for rotation upon frame 22, all in a construction now generally found in current, conventional wheelchairs. Wheelchair 20 is moved along in a conventional manner, either by being manipulated by a person (not shown) outside the wheelchair who can grasp pushhandles 40 to move the wheelchair 20 along, or by an occupant (not shown) seated upon seat 24. Ordinarily, an occupant may move and maneuver the wheelchair 20 by grasping handwheels 42 mounted upon each of the rear wheels 28, which rear wheels 28 serve as drive wheels. However, because the hand-wheels 42 are coupled directly to respective rear wheels 28, the rear wheels 28 will be driven only in the direction in which a drive force is applied to each hand-wheel 42. As a result, in order to travel in a selected direction, the occupant must intermittently grasp and release each hand-wheel 42 in order to apply drive forces all directed in the same direction. Such grasp-and-release movements are, at best, uncomfortable and inconvenient and, at worst, difficult to administer with a degree of control commensurate with the desired direction and speed of the wheelchair.

The control of velocity and maneuverability of wheelchair 20 is enhanced by the present drive system which includes an actuator in the form of a drive mechanism 50 coupled with each drive wheel 28. Each drive mechanism 50 includes a drive ring 52 carrying a plurality of actuator handgrips 54 spaced circumferentially around the drive ring 52, each handgrip 54 being hinged at a corresponding hinge 56 so as to be movable between a retracted position, as illustrated by handgrip 54A, and an extended position, as illustrated by handgrip 54B. In this manner, any one conveniently located handgrip 54 may be extended so as to be available for grasping by an occupant of wheelchair 20, while the remaining handgrips 54 are retracted so as to be out of the way during actuation of the drive mechanism 50 by movement of the grasped handgrip 54, as will be described in further detail below. Further, all of the handgrips 54 may be moved into the retracted position when the wheelchair 20 is moved by a person outside the wheelchair 20, for ease of maneuvering the wheelchair 20 to avoid obstacles that otherwise might intercept an extended handgrip 54. Drive ring 52 is connected to a central disk 60 by radially extending arms 62, and disk 60 is coupled to hub 36 of drive wheel 28 through a drive assembly 70 constructed in accordance with the present invention and carried by frame 22 of wheelchair 20, all in a manner described as follows, in connection with FIGS. 4 through 10.

Turning now to FIGS. 4 through 10, drive assembly 70 includes a drive shaft in the form of an input shaft 72 which is supported and attached to the frame 22 of wheelchair 20 by a wheelchair axle 74 carried by the frame 22. Input shaft 72 extends along an axle sleeve 76 and is journaled on axle 74 by bearings 77 for rotation about a central axis CA. Preferably, a retaining washer 78 holds the input shaft 72 in place on the axle 74. Input shaft 72 includes an integral flange 80 to which disk 60 of drive ring 52 is secured, as by a number of bolts 84 (see FIG. 3) threaded into complementary holes 86 in flange 80. By virtue of the affixation of disk 60 to flange 80, rotational motion applied to drive ring 52, in either a clockwise or a counterclockwise direction, is transmitted from drive ring 52 to input shaft 72. A shaft seal 90 and dust seal 92 prevent dust and other contaminants from entering the drive assembly 70.

Hub 36 of drive wheel 28 is journaled for rotation on outer surface 94 of a generally cylindrical wall 96 of a carrier cage 100 secured to the frame 22 of wheelchair 20 by a carrier lock plate 102. Carrier lock plate 102 includes an integral boss 104 having a hexagonal outer surface configuration which is received within a complementary socket 106 in the frame 22 and precludes any rotation of carrier lock plate 102, and carrier cage 100, relative to frame 22. Carrier cage 100 is retained within hub 36 by a retainer plate 108 secured to hub 36 by screws 109. Cylindrical needle bearings 110 facilitate rotation of hub 36 on cylindrical wall 96 of carrier cage 100, while carrier cage 100 is precluded from rotation, by screws 112 which secure carrier cage 100 to carrier lock plate 102.

A first sun gear 120 is located upon the input shaft 72 and is coupled to the input shaft 72 by a first clutch 122, the first clutch 122 being oriented such that first sun gear 120 is rotated in a first direction of rotation upon rotation of the input shaft 72 in the first direction of rotation, and the first sun gear 120 is released from rotation with the input shaft 72 upon rotation of the input shaft 72 in a second direction of rotation, opposite to the first direction of rotation. A second sun gear 124 is located upon the input shaft 72, axially adjacent the first sun gear 120, and is coupled to the input shaft 72 by a second clutch 126, the second clutch 126 being oriented such that second sun gear 124 is rotated in a second direction of rotation upon rotation of the input shaft 72 in the second direction of rotation, and the second sun gear 124 is released from rotation with the input shaft 72 upon rotation of the input shaft 72 in the first direction of rotation. A spacer 128 is interposed between the first sun gear 120 and the second sun gear 124.

Figure 6:
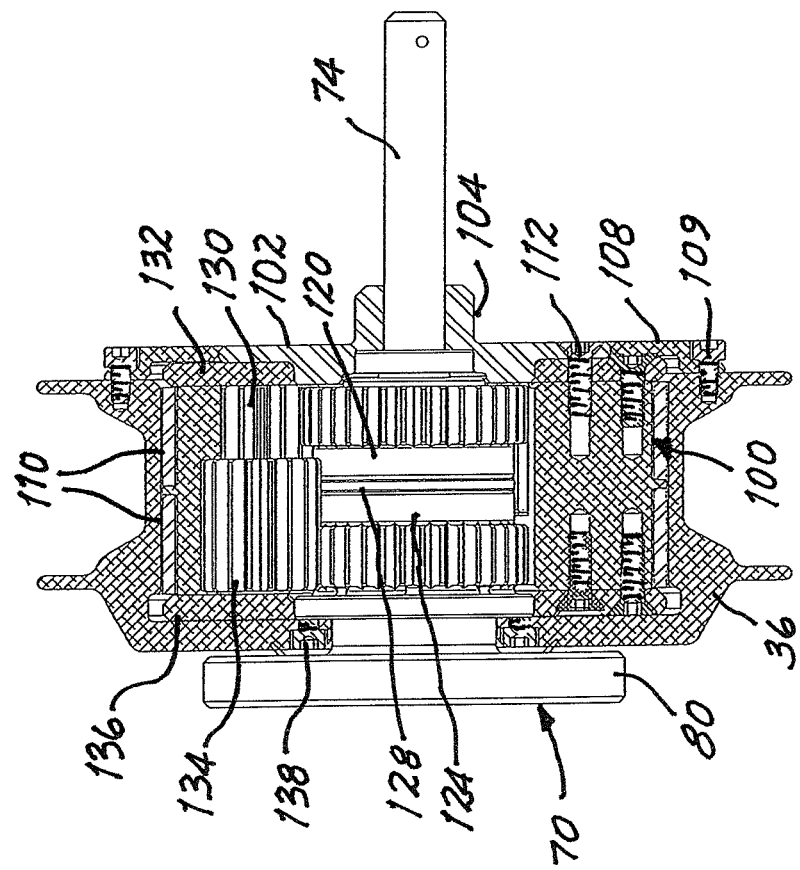
FIG. 6 is a cross-sectional view taken along line 6-6 of FIG. 4.
Figure 7:
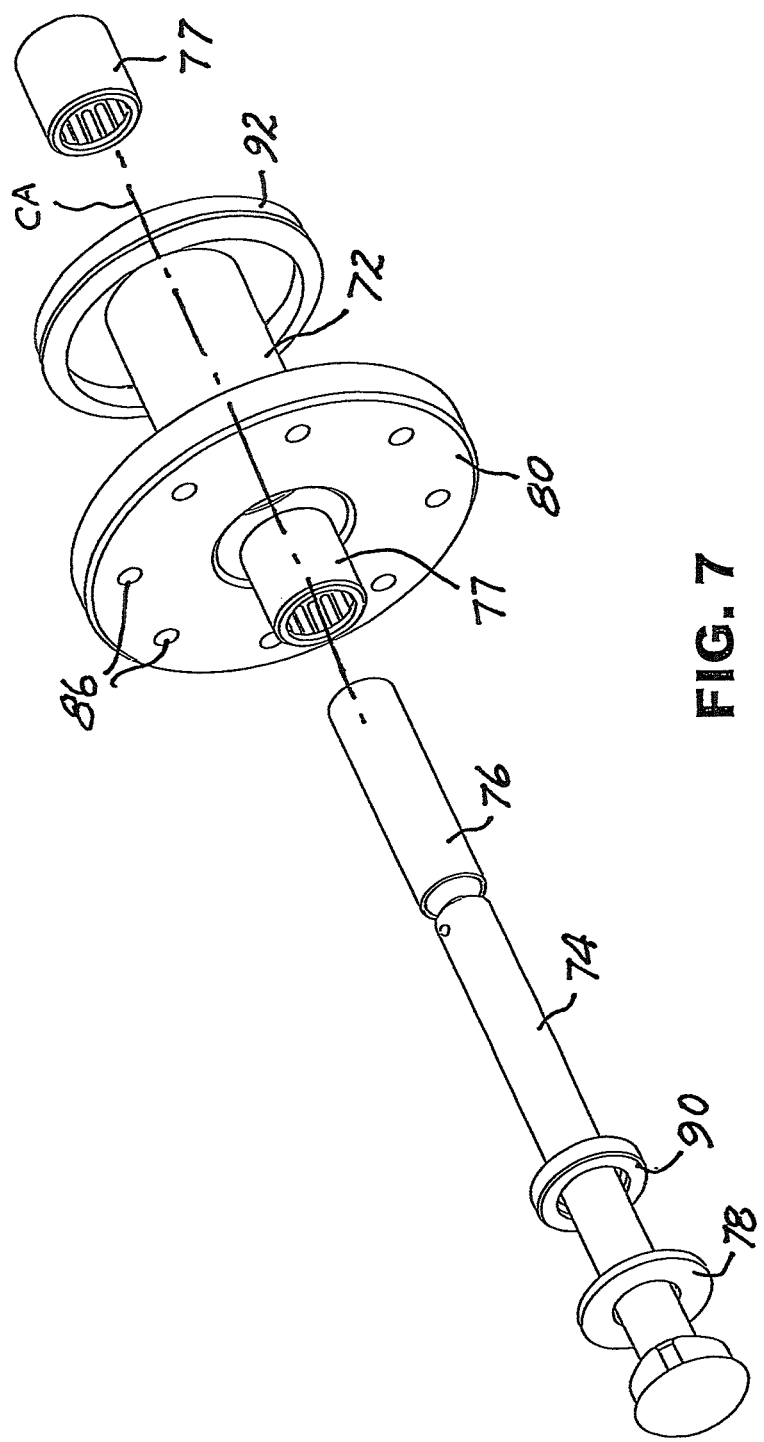
FIG. 7 is an exploded perspective view showing certain component parts of the drive assembly.
Figure 8:
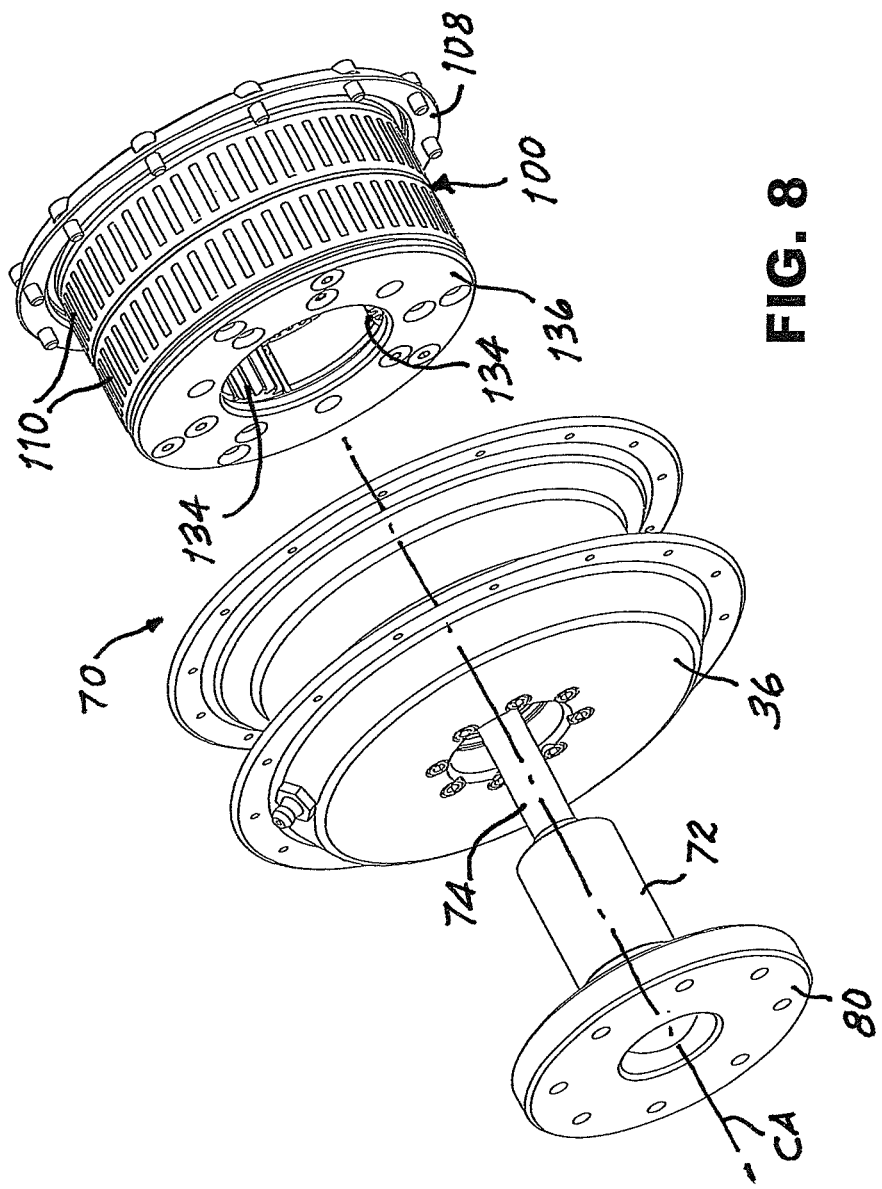
FIG. 8 is an exploded perspective view showing further component parts of the drive assembly.
Figure 9:
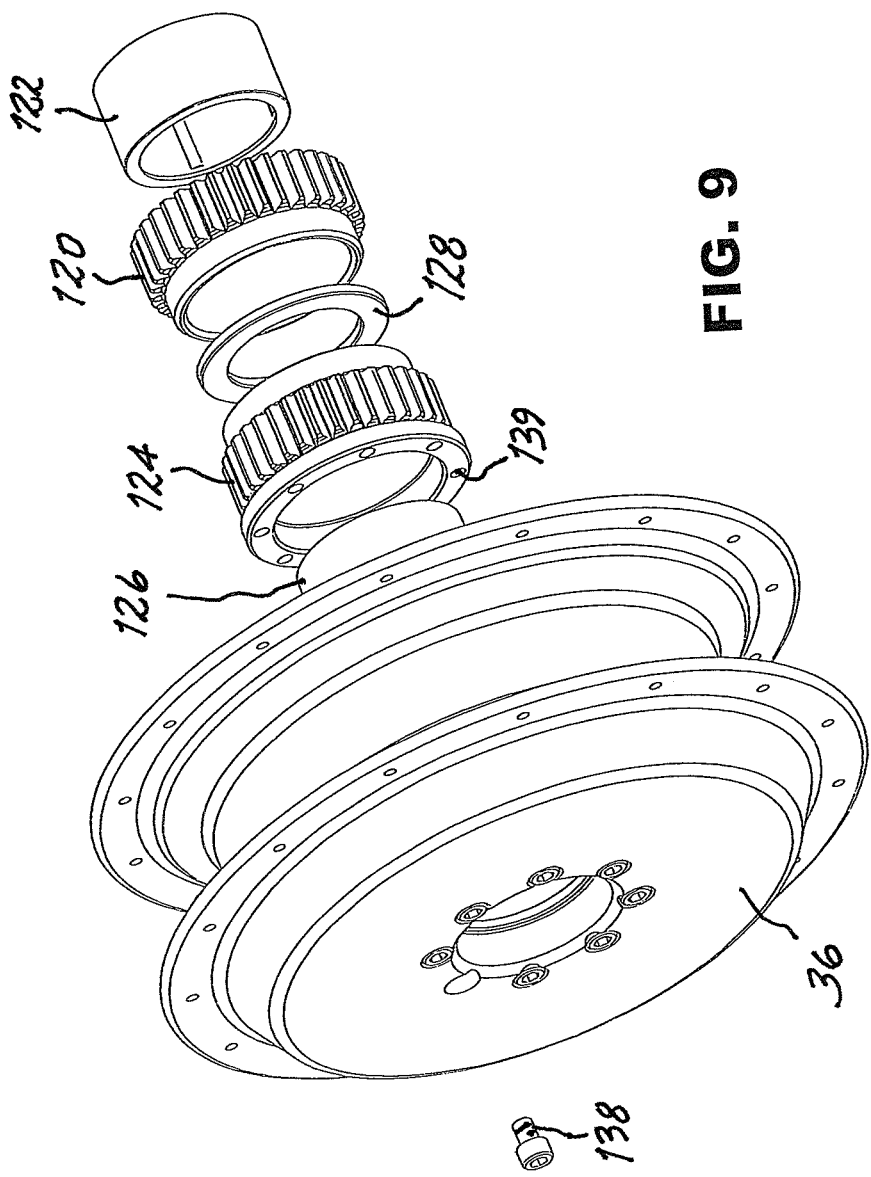
FIG. 9 is an exploded perspective view showing still further component parts of the drive assembly.
Figure 10:
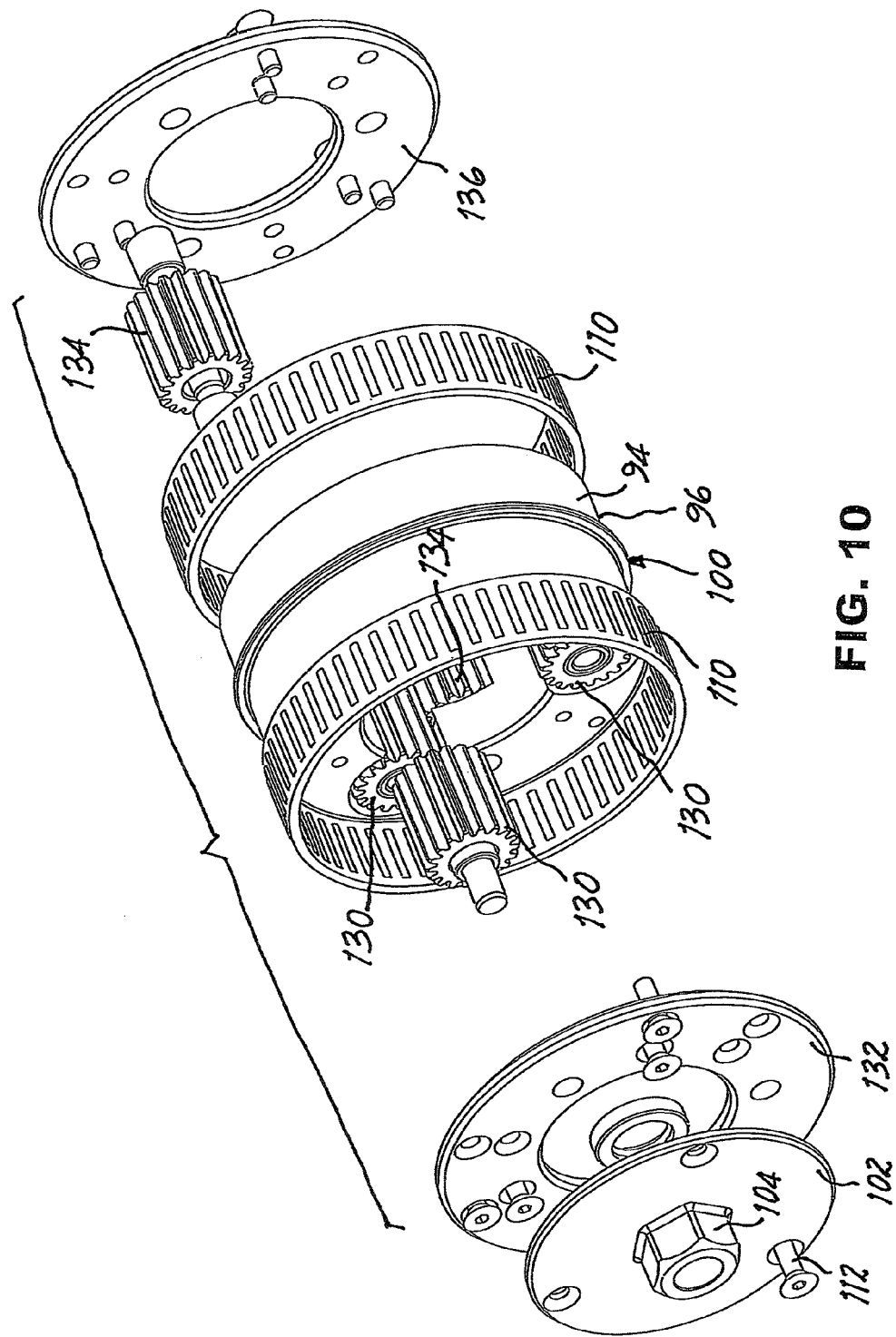
FIG. 10 is an exploded perspective view showing yet further component parts of the drive assembly.

At least one first planet gear 130, and preferably a plurality of first planet gears 130, illustrated in the form of a set of three first planet gears 130, is located within the carrier 100, with each first planet gear 130 supported by a first end wall 132 of the carrier cage 100, journaled for rotation within the carrier cage 100, and engaged with the first sun gear 120. At least one second planet gear 134, and preferably a plurality of second planet gears 134, illustrated in the form of a set of three second planet gears 134, is located within the carrier cage 100, with each second planet gear 134 supported by a second end wall 136 of the carrier cage 100, journaled for rotation within the carrier cage 100, and engaged with the second sun gear 124. As best seen in FIG. 6, each first planet gear 130 axially overlaps a counterpart second planet gear 134.

The second sun gear 124 is affixed to the hub 36, as by screws 138 threaded into holes 139, such that upon rotation of the input shaft 72 alternately in the first direction of rotation and the second direction of rotation in response to corresponding rotation of the drive ring 52 alternately in a clockwise direction and a counterclockwise direction, the hub 36 is rotated about the central axis in the same single direction of rotation during every rotation of the input shaft 72. As a result, movement of a selected handgrip 54B in response to alternate, essentially linear strokes of an occupant's arm will move the corresponding rear wheel 28 in the same direction of rotation during each stroke, to advance the wheelchair 20, with every stroke.

The arrangement wherein the sets of first and second planet gears 130 and 134 overlap one-another axially enables drive mechanism 50 to be highly compact in axial dimensions, while the planetary arrangement of sun gears and planet gears, without requiring a ring gear, also enables compact diametric dimensions, while rendering drive mechanism 50 economical to manufacture and easily maintained.

It will be seen that the present invention attains all of the objects and advantages summarized above, namely: Increased effectiveness and greater simplicity of construction in a drive mechanism that converts reciprocating substantially linear input forces to a rotary power output; provides a compact construction for increased versatility and widespread use in a myriad of applications and, in particular, in a highly maneuverable wheelchair having limited dimensions for increased versatility and mobility; reduces any possible loss of effectiveness while converting reciprocating substantially linear input forces into a continuous rotary power output; enhances the control of velocity and maneuverability of a personal transporter such as a wheelchair; provides increased ease of operation and higher efficiency through a more uniform application of driving forces by an operator of the mechanism; exhibits smooth and quiet operation; reduces wear of component parts of a drive system; provides more resistance to dust, debris and other potential contaminants encountered in the field; reduces requirements for periodic maintenance and repair; enables increased longevity for exemplary performance over an extended service life.

It is to be understood that the above detailed description of preferred embodiments of the invention is provided by way of example only. Various details of design, construction and procedure may be modified without departing from the true spirit and scope of the invention, as set forth in the appended claims.

The invention claimed is:

1. A compact drive assembly for a wheeled transporter having a drive wheel mounted for rotation upon an axle affixed to the transporter, the drive assembly being coupled with the drive wheel for rotating the drive wheel in a same given single direction of rotation in response to the application of reciprocating input forces applied to the drive assembly in opposite directions, the drive wheel having a hub with a central axis, the drive assembly comprising:
   a drive shaft journaled for rotation upon the axle, the drive shaft extending in an axial direction along the central axis of the hub;
   a first sun gear located upon the drive shaft;
   a first clutch coupling the first sun gear with the drive shaft for rotation in a first direction of rotation upon rotation of the drive shaft in the first direction, and releasing the first sun gear from rotation with the drive shaft upon rotation of the drive shaft in a second direction opposite the first direction;
   a second sun gear located upon the drive shaft axially adjacent the first sun gear;
   a second clutch coupling the second sun gear with the drive shaft for rotation in the second direction of rotation upon rotation of the drive shaft in the second direction, and releasing the second sun gear from rotation with the drive shaft upon rotation of the drive shaft in the first direction;
   at least one first planet gear engaged with the first sun gear for rotation with the first sun gear;
   at least one second planet gear engaged with the second sun gear for rotation with the second sun gear;
   the first planet gear axially overlapping the second planet gear along the axial direction and engaging the second planet gear for rotation of the second planet gear with the first planet gear; and
   an actuator coupled to the drive shaft for rotation of the drive shaft alternately in the first direction and the second direction in response to reciprocating forces applied to the actuator in corresponding opposite first and second strokes;
   the second sun gear being coupled to the hub such that upon rotation of the drive shaft alternately in the first direction and the second direction in response to the first and second strokes, respectively, the hub is rotated about the central axis in the same single direction of rotation during each rotation of the drive shaft.

2. The compact drive assembly of claim 1 including at least three first planet gears and at least three corresponding second planet gears.

3. The compact drive assembly of claim 1 wherein the first and second planet gears are mounted within a carrier affixed to the transporter.

4. The compact drive assembly of claim 3 wherein the carrier is affixed to the transporter against rotation during rotation of the drive shaft.

5. The compact drive assembly of claim 3 including at least three first planet gears and at least three corresponding second planet gears.

6. The compact drive assembly of claim 1 wherein the actuator comprises a handgrip affixed to the drive shaft.

7. A wheelchair having a seat for accommodating an occupant, and a compact drive assembly constructed in accordance with claim 1.

8. The wheelchair of claim 7 wherein the wheelchair includes at least one drive wheel, and the actuator includes at least one handgrip located within reach of the occupant for application of the opposite first and second strokes.

9. The wheelchair of claim 8 wherein the wheelchair includes a plurality of handgrips spaced circumferentially apart adjacent the drive wheel.

10. The wheelchair of claim 7 wherein the wheelchair includes two drive wheels and a drive assembly coupled with each drive wheel, each actuator including at least one handgrip located within reach of the occupant for application of the opposite first and second strokes to each actuator.

11. The wheelchair of claim 8 wherein the wheelchair includes a plurality of handgrips spaced circumferentially apart adjacent each drive wheel.

12. A method for driving a wheeled transporter having drive assembly coupled to a drive wheel mounted for rotation upon an axle affixed to the transporter, the method including rotating the drive wheel in a same single direction of rotation in response to the application of reciprocating input forces applied to the drive assembly in opposite directions, the drive wheel having a hub with a central axis, the method comprising:
- journaling a drive shaft for rotation upon the axle, with the drive shaft extending in an axial direction along the central axis of the hub;
- locating a first sun gear upon the drive shaft;
- coupling the first sun gear with the drive shaft with a first clutch oriented for rotation of the first sun gear in a first direction of rotation upon rotation of the drive shaft in the first direction, and releasing the first sun gear from rotation with the drive shaft upon rotation of the drive shaft in a second direction opposite the first direction;
- locating a second sun gear upon the drive shaft axially adjacent the first sun gear;
- coupling the second sun gear with the drive shaft with a second clutch oriented for rotation of the second sun gear in the second direction of rotation upon rotation of the drive shaft in the second direction, and releasing the second sun gear from rotation with the drive shaft upon rotation of the drive shaft in the first direction;
- engaging at least one first planet gear with the first sun gear for rotation with the first sun gear;
- engaging at least one second planet gear with the second sun gear for rotation with the second sun gear;
- overlapping the first planet gear axially with the second planet gear along the axial direction and engaging the second planet gear for rotation of the second planet gear with the first planet gear;
- coupling an actuator to the drive shaft for rotation of the drive shaft alternately in the first direction and the second direction in response to reciprocating forces applied to the actuator in corresponding opposite first and second strokes;
- coupling the second sun gear to the hub such that upon rotation of the drive shaft alternately in the first direction and the second direction in response to the first and second strokes, respectively, the hub is rotated about the central axis in the same single direction of rotation during each rotation of the drive shaft.

13. The method of claim 12 including engaging at least three first planet gears with the first sun gear and engaging at least three corresponding second planet gears with the second sun gear.

14. The method of claim 12 including mounting the first and second planet gears within a carrier affixed to the transporter.

15. The method of claim 14 including affixing the carrier to the transporter against rotation of the carrier during rotation of the drive shaft.

16. The method claim 15 including engaging at least three first planet gears with the first sun gear and engaging at least three corresponding second planet gears with the second sun gear.

17. The method of claim 12 including affixing a handgrip to the drive shaft.

18. The method of claim 12 including affixing a plurality of hand grips to the drive shaft, with the handgrips spaced apart circumferentially around the central axis and each handgrip spaced radially from the central axis.

* * * * *